United States Patent [19]

Oestreich

[11] Patent Number: 4,846,684
[45] Date of Patent: Jul. 11, 1989

[54] JAW MODEL

[76] Inventor: Gerd Oestreich, Wilhelmstrasse 96, D-1000 Berlin 20, Fed. Rep. of Germany

[21] Appl. No.: 54,016

[22] Filed: May 26, 1987

[30] Foreign Application Priority Data

Jun. 13, 1986 [DE] Fed. Rep. of Germany ....... 3619869

[51] Int. Cl.⁴ .................... A61C 11/00; G09B 23/28
[52] U.S. Cl. ..................................... 433/213; 434/263
[58] Field of Search ................... 433/213, 74, 49, 34, 433/180, 181, 182, 183, 184, 196; 434/263, 264

[56] References Cited

U.S. PATENT DOCUMENTS

| | | | |
|---|---|---|---|
| 961,262 | 6/1910 | Slough | 433/26 |
| 1,387,540 | 8/1921 | Hawksworth et al. | 433/213 |
| 2,780,002 | 2/1957 | Shea et al. | 434/263 |
| 3,478,428 | 11/1969 | Stengel | 433/74 |
| 3,641,670 | 2/1972 | Karageorge | 433/180 |
| 3,908,272 | 9/1975 | Arnold | 434/264 |

Primary Examiner—John J. Wilson
Attorney, Agent, or Firm—Mark P. Stone

[57] ABSTRACT

In a jaw model, the jaw arch (2) is provided with a recess (4), which is arranged rotatably an insert part (5) carrying, on sides located opposite one another, different tooth or artificial tooth shapes (7,8) which can be moved into the particular correct position by rotating the insert part.

12 Claims, 3 Drawing Sheets

JAW MODEL

BACKGROUND OF THE INVENTION

The invention relates to a jaw model with at least one insert part arranged on a portion of a jaw arch and serving for the demonstration of tooth-preserving and partially prosthetic dental work.

Jaw models of the above type are mainly used by the dentist to instruct patients, since they have the advantage of being easier to understand than mere explanations or explanations with the aid of picture material. There are known jaw models in which various insert parts can be inserted and locked successively at the point intended for the artificial tooth. In the known models, it is comparatively laborious and time-consuming to exchange the insert parts, and the preconditions for a quick and direct comparison of different types of artificial teeth, that is to say one which is conducive to deciding on one type or another, are therefore not provided. Moreover, a disadvantage of the known jaw models in that the fastening mechanisms for the insert parts give a strange appearance to the jaw portion equipped with the artificial tooth, and that replacement pieces showing alternative solutions can easily be lost and/or damaged.

SUMMARY OF THE INVENTION

The object on which the invention is based is to provide a jaw model, in which the abovementioned disadvantages are eliminated and which, in particular, makes it possible to put alternative types of artificial teeth into the functional position quickly and simply. According to the invention, this object is achieved because the insert part consists of a basic body which is mounted rotatably in a recess of the jaw arch and forms replicas of the jaw arch in the region of the recess and which is equipped, on its periphery, with dentures especially formed by individual teeth, tooth groups or bridges or with stumps serving for fastening these dentures and simulating prepared teeth, all pivotable into the functional position.

The jaw model according to the invention is not only simple to handle, but also makes it possible, in the most confined space possible, to carry out a rapid direct comparison of alternative types of artificial teeth, the rotatable arrangement of the insert part making it easier to view the artificial tooth from different sides. The fact that the particular artificial tooth shapes can be arranged unreleasably on a basic body and special complicated fastening and locking means are superfluous also has a favorable effect on costs.

BRIEF DESCRIPTION OF THE DRAWINGS

The invention is explained in detail below with reference to an exemplary embodiment illustrated in the accompanying drawing. In this.

DESCRIPTION OF THE BEST MODES FOR CARRYING OUT THE INVENTION

Figure 1:
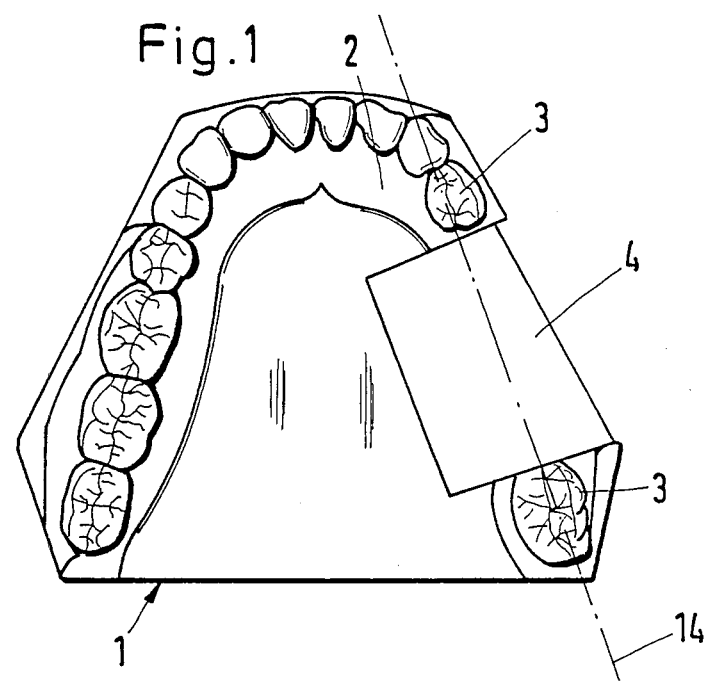
FIG. 1 shows a plan view of a jaw model without an insert part.
Figure 2:
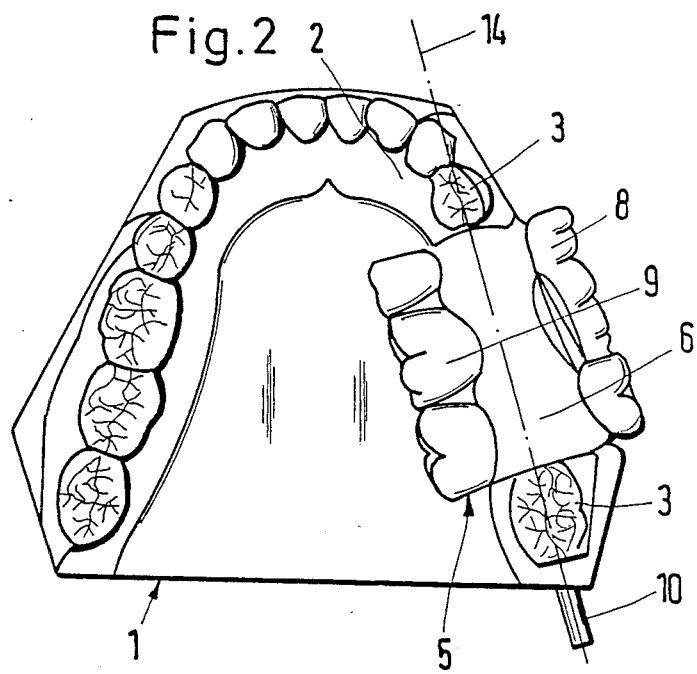
FIG. 2 shows a plan view of the jaw model according to FIG. 1 with an insert part.
Figure 3:
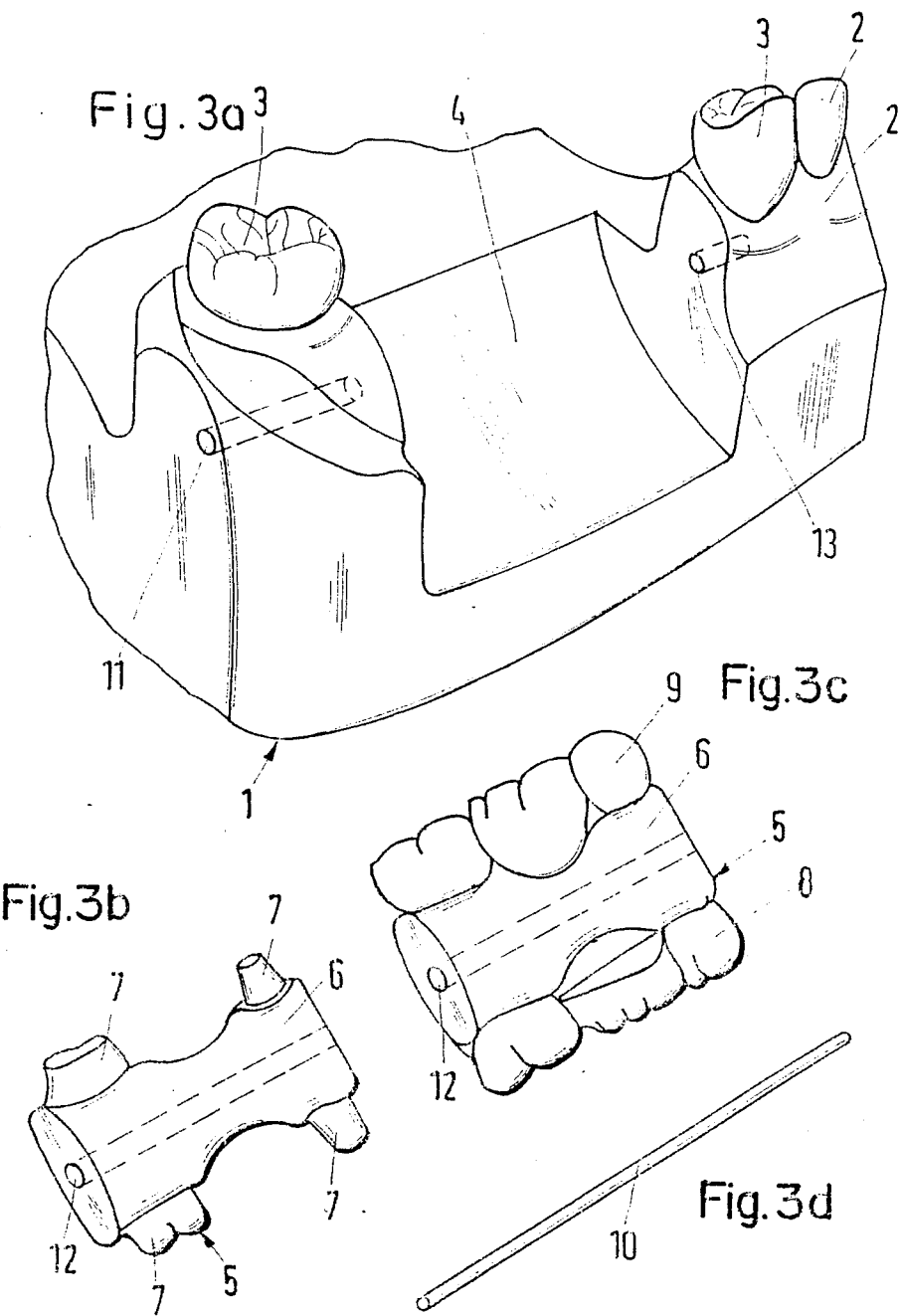
FIG. 3a–3d show an exploded perspective representation of part of a jaw model with two insert parts and with a pin serving for fastening the particular insert part.
Figure 4:
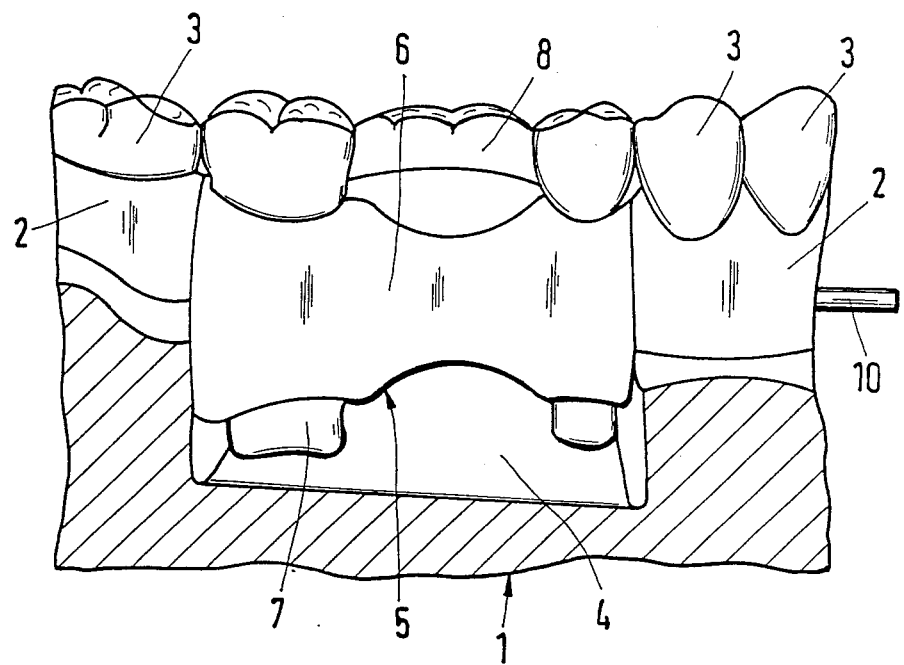
FIG. 4 shows a section through part of the jaw model according to the preceding Figures, with the artificial tooth rotated into the correct position.

In the Figures, 1 denotes, in general, a jaw with a jaw arch 2. The jaw arch carries a row of healthy teeth 3 and has a recess 4 in the region in which an artificial tooth is intended. An insert part 5 consisting of a basic body 6 and of prepared tooth shapes 7 or artificial tooth shapes 8 and 9 fits into the recess 4. The artificial tooth shape 8 can be formed, for example, by a gold suspension bridge and the artificial tooth shape 9 by a porcelain bridge. 10 denotes a cylindrical wire pin which can be introduced into bores 11, 12 and 13 in the jaw arch 2 or insert part 5 and which forms the axis of rotation 14 for the insert part.

The insert part 5 can easily pivot about its axis of rotation. If required, the wire pin 10 can be removed easily and also insert parts exchanged.

As already mentioned in the introduction, the jaw model described offers the advantage, in comparison with picture material and models conventional hitherto, that it can give a large amount of information quickly in a very confined space, without the need to interchange alternative solutions. Thus, for example, it becomes appreciably easier for the patient to choose between a porcelain bridge and a gold suspension bridge. The model can of course also be used for teaching purposes at universities or schools.

I claim:

1. A jaw model with at least one insert part arranged on a portion of a jaw arch and serving for the demonstration of tooth-preserving and partially prosthetic dental work, said insert part (5) including a basic body (6) which is mounted rotatably in a recess (4) of the jaw arch (2) and forms replicas of the jaw arch (2) in the region of the recess (4) and which is equipped, on its periphery, with dentures formed by individual teeth, tooth groups (9) or bridges (8) or with stumps (7) serving for fastening these dentures and simulating prepared teeth, said dentures representing a plurality of separate alternative types of dental arrangements fixedly mounted relative to each other, said jaw arch including a fixed dental arrangement thereon, said basic body being rotatable relative to said fixed dental arrangement on said jaw arch, said dentures being pivotable into a functional position by rotation of the insert part relative to the fixed dental arrangement on said jaw arch.

2. The jaw model as claimed in claim 1, wherein the insert part (5) has an axis of rotation (14) which extends in the direction of the jaw arch (2).

3. The jaw model as claimed in claim 2, wherein the insert part (5) and the jaw arch (2) are provided with aligned bores (11, 12, 13) for receiving a cylindrical wire pin (10) which forms the axis of rotation (14) for the insert part (5).

4. The jaw model as claimed in claim 3, wherein the wire pin (10) can be introduced from the end of the jaw arch (2) into the aligned bores (11, 12, 13) of the jaw arch (2) and of the insert part (5).

5. A jaw model with at least one insert part arranged on a portion of a jaw arch and serving for the demonstration of tooth-preserving and partially prosthetic dental work, said insert part (5) including a basic body (6) which is mounted rotatably in a recess (4) of the jaw arch (2) and forms replicas of the jaw arch (2) in the region of the recess (4) and which is equipped, on its periphery, with dentures representing a plurality of separate alternative types of dental arrangements fixedly mounted relative to each other, said jaw arch including a fixed dental arrangement thereon, said basic body being rotatable relative to said fixed dental arrangement on said jaw arch, said dentures being pivotable into a functional position by rotation of the insert part relative to the fixed dental arrangement on said jaw arch.

6. The jaw model as claimed in claim 5, wherein the insert part (5) has an axis of rotation (14) which extends in the direction of the jaw arch (2).

7. The jaw model as claimed in claim 6, wherein the insert part (5) and the jaw arch (2) are provided with aligned bores (11, 12, 13) for receiving a cylindrical wire pin (10) which forms the axis of rotation (14) for the insert part (5).

8. The jaw model as claimed in claim 7, wherein the wire pin (10) can be introduced from the end of the jaw arch (2) into the aligned bores (11, 12, 13) of the jaw arch (2) and of the insert part (5).

9. The jaw model as claimed in claim 5 wherein said dentures representing alternative types of dental arrangements comprise individual teeth.

10. The jaw model as claimed in claim 5 wherein said dentures representing alternative types of dental arrangements comprise tooth groups.

11. The jaw model as claimed in claim 5 wherein said dentures representing alternative types of dental arrangements comprise bridges.

12. The jaw model as claimed in claim 5 wherein said dentures representing alternative types of dental arrangements comprise stumps serving for fastening dentures and simulating prepared teeth.

* * * * *